United States Patent [19]

Hidemitsu et al.

[11] Patent Number: 4,815,658
[45] Date of Patent: Mar. 28, 1989

[54] CONTROL DEVICE FOR AUTOMOTIVE AIR CONDITIONING SYSTEM

[75] Inventors: Akabane Hidemitsu, Takasaki; Hoshino Seiichi, Nitta; Tamura Yasuji, Ojima; Isobe Toshimi, Isesaki, all of Japan

[73] Assignee: Sanden Corporation, Isesaki, Japan

[21] Appl. No.: 182,206

[22] Filed: Apr. 15, 1988

[30] Foreign Application Priority Data

Apr. 15, 1987 [JP] Japan .................. 62-57299[U]

[51] Int. Cl.⁴ .................. B60H 1/02; G05D 23/00
[52] U.S. Cl. .................. 237/2 A; 237/12.3 B; 237/12.3 A
[58] Field of Search ............ 237/2 A, 12.3 A, 12.3 B; 165/42; 236/13

[56] References Cited

U.S. PATENT DOCUMENTS

| | | |
|---|---|---|
| 3,658,244 | 4/1972 | Caldwell .................. 237/2 A |
| 3,934,642 | 1/1976 | Coulson et al. . |
| 3,983,930 | 10/1976 | Franz .................. 236/13 X |
| 4,223,720 | 9/1980 | Poirier d'Ange d'Crsay et al. . |
| 4,289,195 | 9/1981 | Bellot et al. . |
| 4,356,965 | 11/1982 | Matsushima et al. . |
| 4,379,484 | 4/1983 | Lom et al. . |
| 4,513,808 | 4/1985 | Ito et al. . |
| 4,537,245 | 8/1985 | Nishimura et al. . |
| 4,549,692 | 10/1985 | Busch et al. . |
| 4,562,954 | 1/1986 | Kajita . |
| 4,572,430 | 2/1986 | Takagi et al. . |
| 4,593,852 | 6/1986 | Tajima et al. . |
| 4,681,153 | 7/1987 | Uchida . |

FOREIGN PATENT DOCUMENTS

| | | |
|---|---|---|
| 2815012 | 7/1978 | Fed. Rep. of Germany . |
| 2655554 | 8/1978 | Fed. Rep. of Germany . |
| 57-26010 | 2/1982 | Japan . |
| 57-182514 | 11/1982 | Japan . |
| 57-182515 | 11/1982 | Japan . |
| 58-85711 | 5/1983 | Japan . |
| 58-218420 | 12/1983 | Japan . |

Primary Examiner—Henry A. Bennet
Attorney, Agent, or Firm—Banner, Birch, McKie & Beckett

[57] ABSTRACT

A control device which includes a heater core for heating the air, temperature sensors for detecting the temperature of the air, air mix dampers for adjusting the volume of the air through passing the heater core, a water valve for adjusting the volume of the water which is used for cooling an automobile engine, an actuator for operating the air mix damper and the water valve and a control unit is disclosed. The control unit compares a desired position, and predetermined positions of an opening angle of the actuator with each other. The temperature of the air which is blown out from an automotive air conditioning system can thereby be controlled in accordance with the compared results.

8 Claims, 3 Drawing Sheets

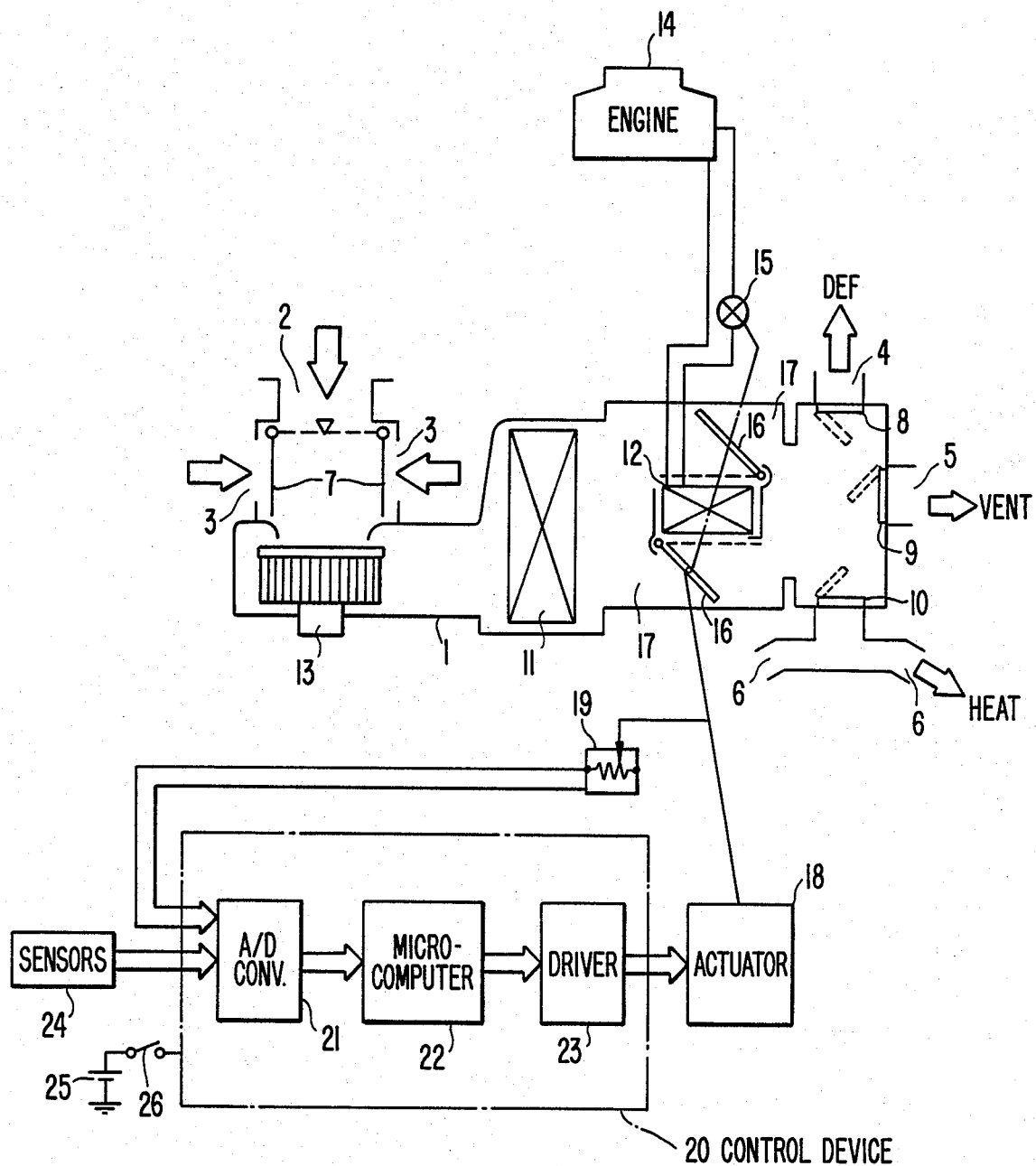

CONTROL DEVICE FOR AUTOMOTIVE AIR CONDITIONING SYSTEM

TECHNICAL FIELD

This invention relates generally to automotive air conditioning systems, and more particularly, to a method and apparatus for controlling the opening angle of an air mix damper and a water valve to control and adjust the temperature of the air delivered from the air conditioning system to the automobile passenger compartment.

BACKGROUND OF THE INVENTION

Typically, in automotive air conditioning systems which have an automatic control device, the automatic control device detects the air temperature of an automobile compartment and the ambient air temperature and compares a predetermined or selected air temperature with the detected air temperatures. The ratio of air heated by a heater core with respect to air bypassing the heater core and passing through a duct is determined in accordance with an opening angle of an air mix damper which is controlled by an actuator based on the temperataure comparison. The opening angle of a water valve is also determined in conjunction with that of the air mix damper since the air mix damper is mechanically coupled with the water valve through a wire, mechanical link or the like. The air mix damper is also mechanically coupled with the actuator. In this way, a water valve and air mix damper may be operated together by an actuator.

In the above described automotive air conditioning system, and with reference to FIG. 1, it can be seen that there is hysteresis in the timing of the opening and closing operation of the water valve. Although the water valve is mechanically coupled with the air mixer damper as described above, the water valve does not open until the air mix damper has opened a predetermined amount as defined by a predetermined opening angle. Accordingly, since the air mix damper has already opened to a predetermined opening angle before the water valve opens, the temperature of air initially blown out from an outlet of the air conditioning system is either cool or only slightly heated. In a cold or cool environment, which is typically when heated air is desired, this initial blast of cold or cool air into an already cool automobile produces an uncomfortable feeling for those in the passenger compartment of an automobile.

SUMMARY OF THE INVENTION

It is an object of this invention to overcome the drawbacks of the prior art described above. It is a further object of this invention to provide an automotive air conditioning system which can continuously control the temperature of the air blown out therefrom in response to an opening angle of an air mix damper.

The above objects of this invention are achieved by providing a control device which includes a heater core for heating air, temperature sensors for detecting the temperature of the air, air mix dampers for adjusting the volume of the air passing through the heater core, a water valve for adjusting the volume of the water used for cooling an automobile engine, an actuator for operating the air mix damper and the water valve and a control unit. The control unit compares a desired position, an actual position and predetermined positions of an opening angle of the actuator with each other. Since they are mechanically coupled, opening angles of the actuator correspond with opening angles of the air mix dampers and the water valve. The control unit also controls the temperature of the air which is blown out from an automotive air conditioning system in accordance with the results of the comparison.

Further objects, features and other aspects of this invention will be understood from the detailed description of the preferred embodiments of this invention. The scope of the invention is set forth in the claims appended hereto.

BRIEF DESCRIPTION OF THE DRAWINGS

FIG. 2 is a schematic view of an automotive air conditioning system applicable to this invention.

DETAILED DESCRIPTION OF THE PREFERRED EMBODIMENT

Figure 1:
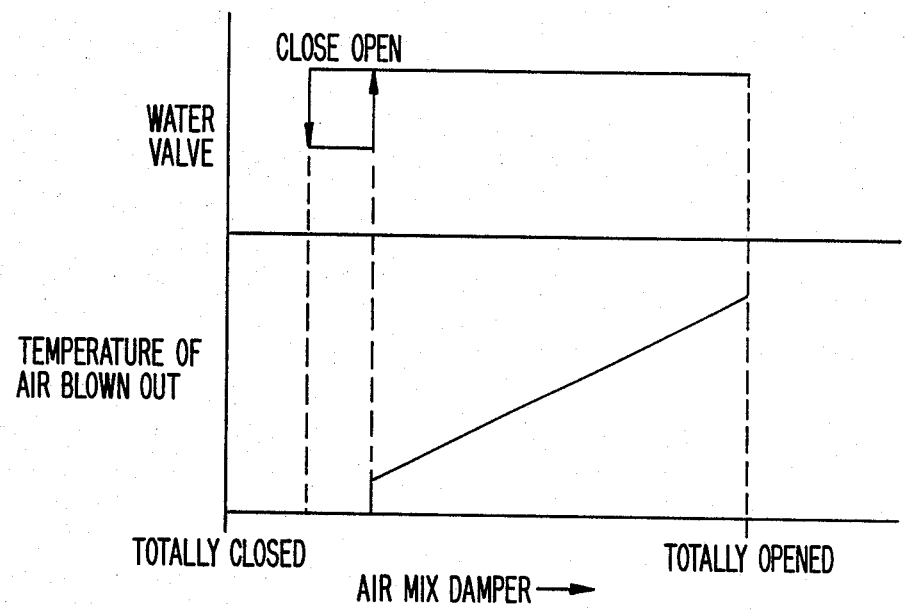
FIG. 1 is a graph illustrating the relationship between an opening angle of an air mix damper and the relative temperature of the air blown out therefrom in a conventional automotive air conditioning system.

Referring first to FIG. 2, the arrangement of an automotive air conditioning system applicable to this invention is shown.

Duct 1 has fresh air inlet 2 and recirculated air inlet 3 at its upstream end, and defroster air outlet 4, upper air outlet 5 and lower air outlet 6 at its downstream end. Arranged within duct 1 are first selector damper 7 disposed to be selectively enabled to assumed a position to allow recirculated air or fresh air to be taken into an duct 1. The damper position shown by the solid lines in FIG. 2 represents the position of damper 7 for fresh air intake. The damper position shown by the dotted lines represents the position of damper 7 for recirculated air intake. Also within duct 1 is second selector damper 8 disposed to selectively assume a defroster discharge position (dotted lines) or a closed position (solid lines), a third selector damper 9 disposed to selectively assume an upper vent discharge position (dotted lines) or a closed position (solid lines) and fourth selector damper 10 disposed to selectively assume a lower vent discharge position (dotted lines) or a closed position (solid lines). These dampers may be selectively positioned to allow for a combination of vent uses. Also provided at an axially intermediate location in duct 1 are evaporator 11 and heater core 12, the latter being downstream of the former. A blower 13 is provided upstream of evaporator 11.

Evaporator 11 is part of a refrigerating circuit and heater core 12 is heated by cooling water used for cooling the automobile engine 14. The volume of cooling water allowed to flow into heater core 12 is controlled by water valve 15 which is disposed at a condit between heater core 12 and engine 14.

Air mix dampers 16 are provided at the inlet and outlet of heater core 12 to control and adjust the ratio of the volume of air which passes through heater core 12 with respect to the volume of air which passes through bypass 17 and bypassing heater core 12 to thereby control the degree of heating of the air by heater core 12.

Air mix damper 16 is mechanically coupled with water valve 15 through a wire, mechanical link or the like. Air mix damper 16 is also mechanically coupled in a similar fashion to actuator 18. Therefore, air mix damper 16 and water valve 15 can be operated together by actuator 18. The dampers 16 at the inlet and outlet of the heater core 12 are preferably coupled and operate together to provide similar opening angles with respect to each other.

Potentiometer 19 operatively cooperates with actuator 18 and electrically communicates the position of actuator 18 to control device 20. Since actuator 18 is coupled to damper 16 and valve 15, based on knowledge of the position of actuator 18, the positions of damper 16 and valve 15 can be calculated.

Control device 20 includes A/D converter 21, micro-computer 22 and driver 23, each of which is coupled together. A plurality of sensors 24, for example, a compartment air temperature sensor, an ambient air temperature sensor, an evaporator temperature sensor, a water temperature sensor, a sunlight temperature sensor, etc., are also provided. Potentiometer 19 and temperature sensors 24 are each connected to control device 20. Control device 20 is operatively connected to actuator 18 to control actuator 18. Control device 20 may also be connected to a battery 25 through an ignition switch 26.

Micro-computer 22 computes the temperature of the air blown out to an automobile compartment based on signals detected by sensors 24 and generates outputs signals to actuator 18 and blower 13 to control the opening angle of air mix damper 16 and the voltage of blower 13. For sake of clarity, the connection between the blower annd micro-computer 22 is not shown in FIG. 2.

Figure 3:
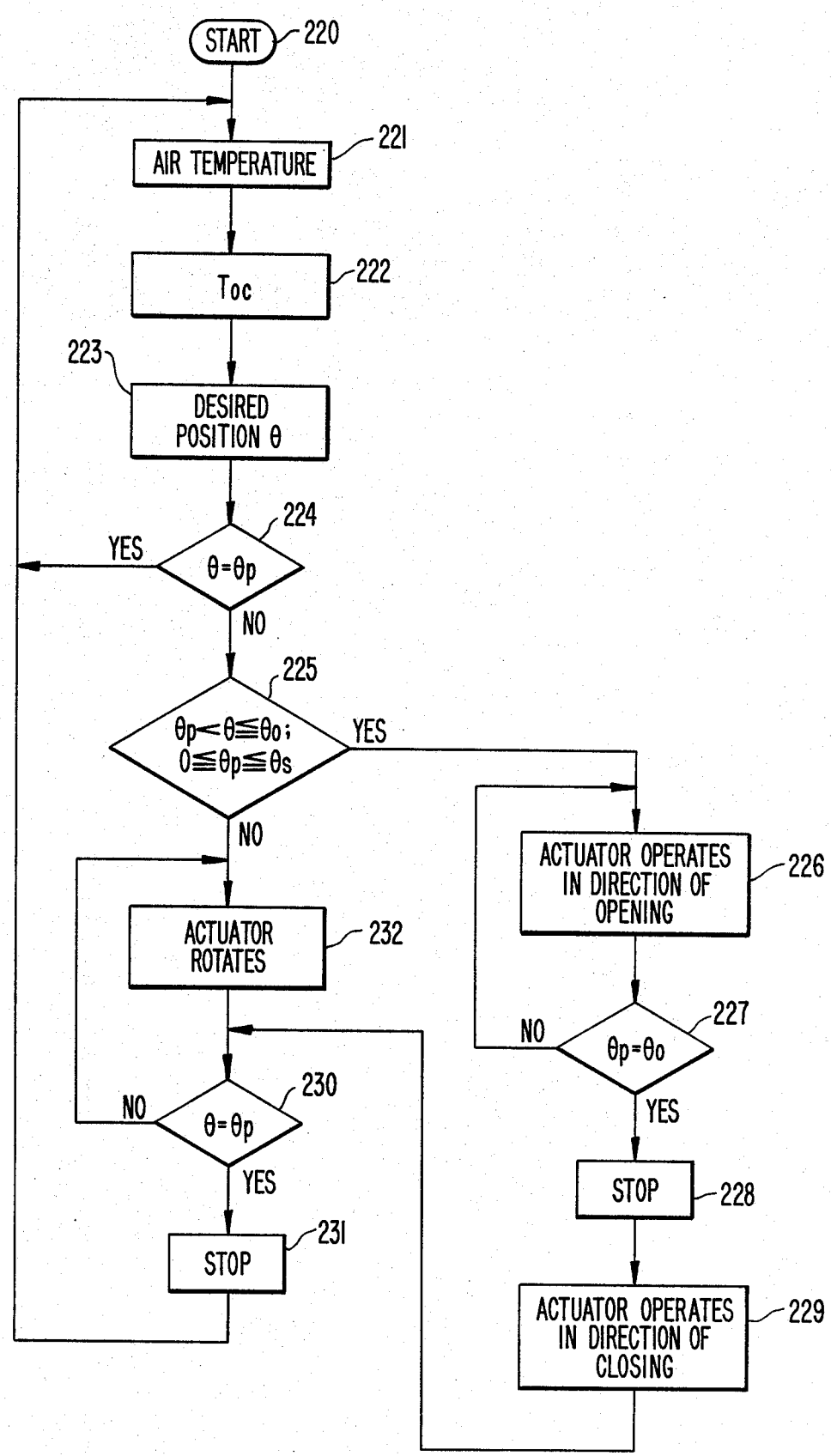
FIG. 3 is a flow chart which illustrates the operation of a control device in accordance with a preferred embodiment of this invention.

Referring to FIG. 3, a flow chart of a control operation performed by the micro-computer in the control device is shown. For clarity, the symbols used in the flow chart will first be listed and defined here Toc = temperature at which air blown out of the air conditioning system must be for the temperature of air in the automobile compartment to be at a predetermined temperature.

$\theta$ = The desired opening angle of actuator 18 to obtain the predetermined temperature. (This also corresponds with the opening angle or position of damper 16 and vave 15 since these are mechanically coupled).

$\theta p$ = The actual opening angle of actuator 18 (this also corresponds with the opening angle of damper 16 and valve 15).

O = Angle at which actuator is totally closed (corresponds to position where damper 16 is totally closed).

$\theta s$ = A first predetermined opening angle of actuator 18 corresponding to the position of the actuator/damper which causes the water valve to close when actuator 18 is moving in the direction of closing the damper. (The direction of closing is indicated as being towards the left by the arrow in FIG. 4.)

Figure 4:
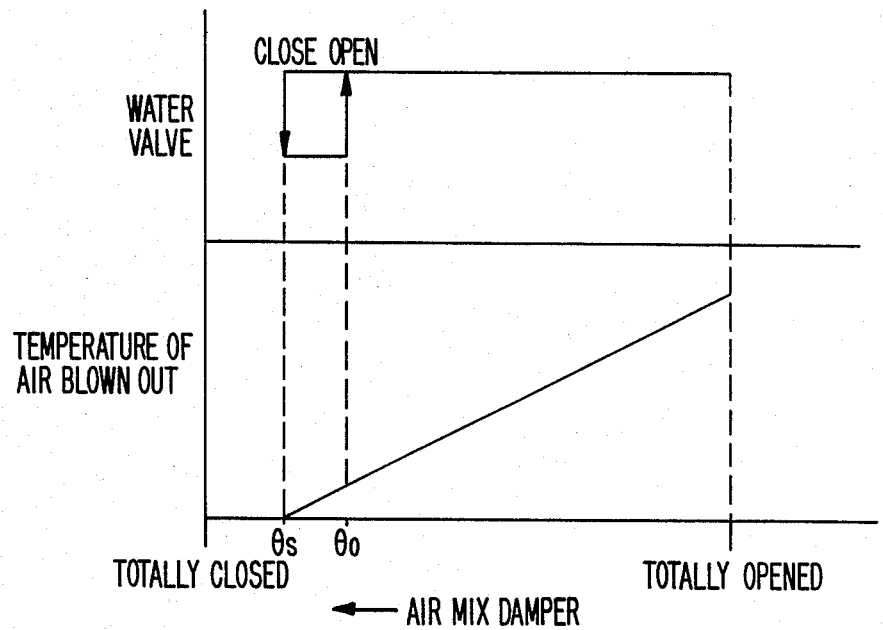
FIG. 4 is a graph illustrating the relationship between an opening angle of an air mix damper and the relative temperature of the air blown out therefrom in an automotive air conditioning system according to the present invention as shown in FIGS. 2 and 3.

$\theta o$ = A second predetermined opening angle of actuator 18 corresponding to the position of the actuator/damper which causes the water valve to open when actuator 18 is moving in the direction of opening the damper (towards the right in FIG. 4.) (o < $\theta s$ < $\theta o$)

The control operation will now be described. When the automotive air conditioning system is turned on (step 220), micro-computer 22 starts to receive input signals related to the temperatures detected by the plurality of sensors 24 (step 221). Based on this information, temperature Toc can be determined (step 222). Toc represents the temperature that the air blown out from the air conditioning system must be for the temperature of air in the compartment to be at a predetermined temperature. Temperature Toc can be determined according to the following equation:

$$Toc = a \times Tset + b \times Tcar + c \times Tout + d \times Tlc + e$$

wherein Tset represents a predetermined air temperature which may be selected in a known manner; Tcar represents a compartment air temperature; Tout represents an ambient air temperature; Tlc represents a sunlight temperature; and the a, b, c, d and e coefficients represent predetermined values which may be positive negative, or zero. Tset, Tcar, Tout and Tc are preferably detected by sensors 24.

Next the desired position $\theta$ is computed (step 223). $\theta$ is determined from the following equation:

$$\theta = 1 \times Toc + m\, Teva + n$$

where Teva represents the temperature of the air prior to entering heater core 12, and 1, m and n are coefficients that represent predetermined values.

Next desired position $\theta$ is compared with actual position $\theta$ p (step 224). When desired position $\theta$ equals actual position $\theta$ p, control returns to step 221. Otherwise, control passes to step 225. In step 225, actual position $\theta$ p of actuator 18 is compared with first predetermined position $\theta$ s and a second predetermined position $\theta$ o of an opening angle of actuator 18. If actual position $\theta$ p is equal to or greater than position 0 and below first predetermined position $\theta$ s, and desired position $\theta$ is greater than actual position $\theta$ p and below second predetermined position $\theta$ o, control passes to step 226. Actuator 18 is rotated in an open direction (step 226). This opens the dampers 16. In step 227, desired position $\theta$ is compared with second predetermined position $\theta$ o. If desired position $\theta$ equals second predetermined position $\theta$ o, actuator 18 stops (step 288). Otherwise, control returns to step 226. After the actuator stops (step 228) the actuator 18 is rotated in a closing direction (step 229), and thereafter control passes to step 230. In step 230, actual position $\theta$ p is compared with desired position $\theta$. If actual position $\theta$ p equals desired position $\theta$, actuator 18 stops (step 231). Otherwise, control passes to step 232.

In step 225, if the above conditions are not met, control passes to step 232. Actuator 18 starts to rotate in a closing direction if $\theta < \theta p$ and rotates in a open direction if $\theta p < \theta$ as determined by the comparison in step 225 (step 232). Thereafter, actual position $\theta$ p is compared with desired position $\theta$ (step 230). If actual position $\theta$ p equals desired position $\theta$, actuator 18 stops (step 231). Otherwise, control returns to step 232 until $\theta = \theta$ p.

With reference to FIGS. 3 and 4, it can be seen that the water valve does not open until the damper has been opened by an angle corresponding to $\theta$ p, when the actuator is rotating in the opening direction. If the desired position $\theta$ is less than $\theta$ o, the water valve will not open if the dampers were just opened to $\theta$ (since $\theta < \theta$). However, according to a novel aspect of this invention, under these conditions if the actual position of the damper is less than θ and less than or equal to θ s (step 225) then the actuator operates in the open direction until the dampers are at the position θ o at which time the actuator stops and the valve 15 opens. Then the actuator starts back in the close direction until the desired position is reached (θ=θ p) at which point the heater core operates with the water valve open thereby advantageously minimizing the drawbacks of prior art systems.

In the above embodiment, although actuator 18 is used as a drive source to operate an air mix damper and a water valve, negative pressure of an automobile engine can be used as the drive source. Also, it is possible that actuator 18 may directly operate an air mix damper and a water valve.

This invention has been described in connection with the preferred embodiment, but this embodiment is merely for example only, and the invention should not be construed as limited thereto. It should be apparent to those skilled in the art that other variations or modifications can be made within the scope of this invention.

We claim:

1. A device for controlling the temperature of air blown out from an automotive air conditioning system, said system comprising:

heater means for heating air;

temperature sensor means for sensing temperatures;

air mix damper means associated with said heater means for controlling the volume of air passing through said heater means;

water valve means for controlling the volume of water used for cooling an automobile engine and allowing a portion of said water to be delivered to said heater means;

actuator means for actuating said air mix damper means and said water valve means and being capable of operating through a predetermined range of opening angles to assume a desired position corresponding to a desired position of said damper means, and controls means for controlling said actuator means, said control means comprising;

first comparison means for comparing a desired position of an opening angle of said actuator means with an actual position of an opening angle of said actuator means and providing a first control signal when said desired position of said actuator means equals said actual position of said actuator means;

second comparison means for comparing said actual position of said actuator means with a closed position of such actuator means and a first predetermined position of an opening angle of said actuator means, and for comparing said desired position of said actuator means with said actual position of said actuataor.means and a second predetermined position of an opening angle of said actuator means in response to the comparison by said first comparison means and the absence of said first control signal, said second comparison means providing a second control signal when said actual position of said actuator means is equal to or greater than said closed position and below said first predetermined position, and said desired position of said actuator means is greater than said actual position of said actuator means and below said second predetermined position, wherein said actuator means operates in a direction of opening of said actuator means in response to said second control signal;

third comparison means for comparing said actual position of said actuator means with said second predetermined position and providing a third control signal when said desired position of said actuator means equals said second predetermined position, wherein said actuator means ceases to operate in the direction of opening of said actuator means in response to said third control signal; and fourth comparison means for comparing said desired position of said actuator means with said actual position of said actuator means and providing a fourth control signal when said desired position of said actuator means equals said actual position of said actuator means, wherein said actuator means stops in response to said fourth control signal.

2. The device of claim 1 wherein response to the comparison by said second comparison means and the absence of said second control signal said actuator means operates.

3. The device of claim 1 wherein response to the comparison by said third comparison means, the presence of said third control signal and said actuator means ceasing to operate in the direction of opening of said actuator means, said actuator means operates in the direction of closing of said actuator means.

4. The device of claim 1 wherein said desired position of said actuator means corresponds with said desired position of said damper means and said actual position of said actuator means corresponds with the actual position of said actuator means.

5. The device of claim 2 wherein said desired position of said actuator means corresponds with said desired position of said damper means and said actual position of said actuator means corresponds with the actual position of said damper means.

6. The device of claim 3 wherein said desired position of said actuator means corresponds with the desired position of said damper means and the actual position of said actuator means corresponds with said actual position of said damper means.

7. The device of claim 1 wherein said first predetermined position corresponds to a position of said actuator means which causes said water valve means to close when the actuator means is moving in the direction of closing of said actuator means.

8. The device of claim 1 wherein said second predetermined position corresponds to a position of said actuator which causes said water valve means to open when the actuator means is moving in the direction of opening of said actuator means.

* * * * *